(12) United States Patent
Wall, II

(10) Patent No.: US 10,000,245 B2
(45) Date of Patent: Jun. 19, 2018

(54) INFLATABLE PANEL HOUSING FOR AN AERODYNAMIC FAIRING ASSEMBLY

(71) Applicant: WALL GLOBAL LLC, Franklin, TN (US)

(72) Inventor: Billy Russell Wall, II, Franklin, TN (US)

(73) Assignee: Wall Global, LLC., Franklin, TN (US)

( * ) Notice: Subject to any disclaimer, the term of this patent is extended or adjusted under 35 U.S.C. 154(b) by 1 day.

(21) Appl. No.: 15/385,816

(22) Filed: Dec. 20, 2016

(65) Prior Publication Data

US 2017/0096179 A1  Apr. 6, 2017

Related U.S. Application Data

(63) Continuation-in-part of application No. 15/115,762, filed as application No. PCT/US2015/034737 on Jun. 8, 2015, now Pat. No. 9,873,467.

(60) Provisional application No. 62/009,683, filed on Jun. 9, 2014.

(51) Int. Cl.
*B62D 35/00* (2006.01)
(52) U.S. Cl.
CPC .................. *B62D 35/001* (2013.01)
(58) Field of Classification Search
CPC .................................................. B62D 35/001
See application file for complete search history.

(56) References Cited

U.S. PATENT DOCUMENTS

| | | |
|---|---|---|
| 3,834,752 A | 9/1974 | Cook et al. |
| 4,006,932 A | 2/1977 | McDonald |
| 4,236,745 A | 12/1980 | Davis |
| 4,601,508 A | 7/1986 | Kerian |
| 4,688,851 A | 8/1987 | Moore |
| 4,702,509 A | 10/1987 | Elliot, Sr. |
| 4,978,162 A | 12/1990 | Labbe |
| 5,058,945 A | 10/1991 | Elliot, Sr. et al. |
| 6,409,252 B1 | 6/2002 | Andrus |
| 6,886,882 B2 | 5/2005 | Farlow et al. |
| 7,147,270 B1 | 12/2006 | Andrus et al. |
| 7,712,822 B2 | 5/2010 | Pfaff |
| 7,866,734 B2 | 1/2011 | Mracek |
| 8,123,281 B2 | 2/2012 | Perkins et al. |
| 8,444,210 B2 | 5/2013 | Domo et al. |
| 8,506,004 B1 | 8/2013 | Vogel et al. |
| 8,622,462 B2 | 1/2014 | Ryan et al. |

*Primary Examiner* — D Glenn Dayoan
*Assistant Examiner* — Melissa A Black
(74) *Attorney, Agent, or Firm* — R. Tracy Crump

(57) ABSTRACT

The panel housing for an aerodynamic fairing assembly using inflatable panels that deploy from the panel housing where the panel housing uses "shaft-less" spring hinges to pivotally connect a pair of gates that partially enclose the deflated panels within the panel housing. The spring hinges are constructed from a wire rod of spring steel bent to a pair of axially aligned spring coils, a central U-shaped neck that bolts to the gate and a pair of end arms that bolt to the end plate of the panel housing. The spring hinges functions as both a hinge mechanism and a torsion spring to normally bias the gate towards its closed orientation.

2 Claims, 6 Drawing Sheets

INFLATABLE PANEL HOUSING FOR AN AERODYNAMIC FAIRING ASSEMBLY

This application is a continuation-in-part of U.S. patent application Ser. No. 15/115,762 filed Aug. 1, 2016, that claims the benefit of PCT Patent Application, Ser. No. PCT/US15/034737 filed Jun. 8, 2015, which claims the benefit of U.S. Provisional Patent Application Ser. No. 62/009,683 filed Jun. 9, 2014, the disclosures of which are hereby incorporated by reference.

This invention relates to an inflatable panel housing used in an aerodynamic fairing assembly for tractor-trailers.

BACKGROUND AND SUMMARY OF THE INVENTION

Aerodynamic fairing assemblies, such as the ones developed and manufactured by Wall Global, LLC. of Franklin, Tenn., use inflatable panels that automatically deploy and retract at certain speeds to cover and enclose the space between the tractor truck and connected trailers. This type of aerodynamic fairing assembly significantly improves the aerodynamics of long haul tractor-trailers, which increases fuel economy and vehicle stability. In this type of fairing assembly, the inflatable panels deploy and retract from vertical panel housings mounted to the rear of either side of the tractor cab. The panel housings use a pair of hinged gates that pivot outward when the inflated panel is deployed and pivot back to partially enclose the deflated panel while stowed within the panel housing. When operating in winter conditions, snow and ice, as well as road debris will accumulate in and around the panel housing and inflatable panels. Ice built up on the gate hinges can cause the hinge to fail or prevent the inflatable panels from deploying properly.

The panel housing of this invention uses "shaft-less" spring hinges to pivotally connect a pair of gates that partially enclose the deflated panels within the panel housing. The spring hinges are constructed from a wire rod of spring steel bent to a pair of axially aligned spring coils, a central U-shaped neck that bolts to the gate and a pair of end arm that bolt to the end plate of the panel housing. The spring hinges functions both a hinge mechanism and a torsion spring to normally bias the gate towards its closed orientation. Because the spring hinges have no physical shaft or pin, the bent wire rod construction of the spring hinge allows a degree of play and deviation in the pivotal movement as the gates move between their open and closed orientations. The bent wire rod construction of the spring hinge allows it to bend and deflect slightly as the gate opens and closes, which helps break up any ice that may collect around the hinge. The spring hinges also eliminate any mechanical binding that can occur with conventional hinges under external load forces caused by cross winds and physical obstructions.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which.

DESCRIPTION OF THE PREFERRED EMBODIMENT

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
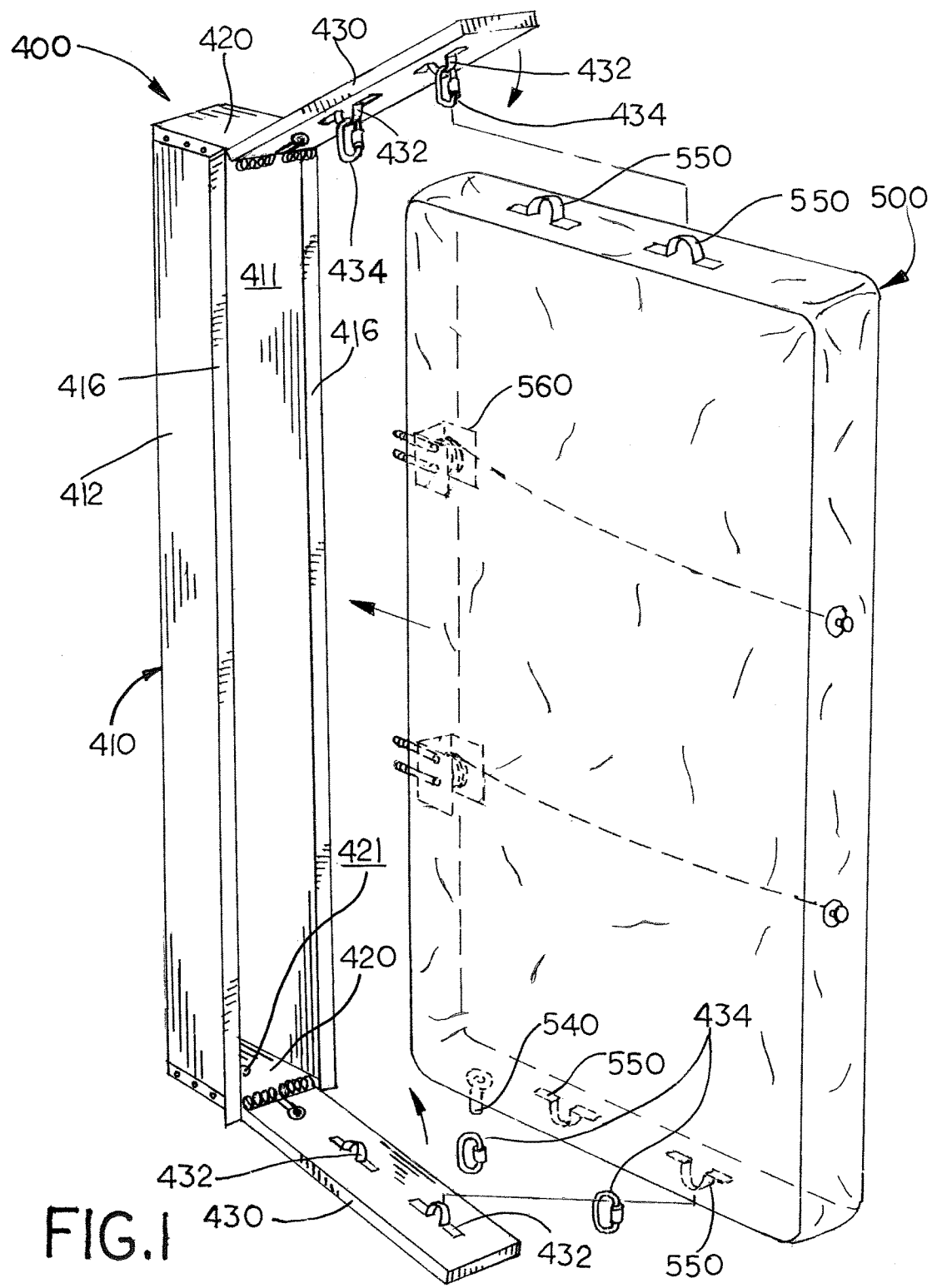
FIG. 1 is a perspective view of the panel housing of this invention and a detached inflatable panel used within the panel housing.
Figure 2:
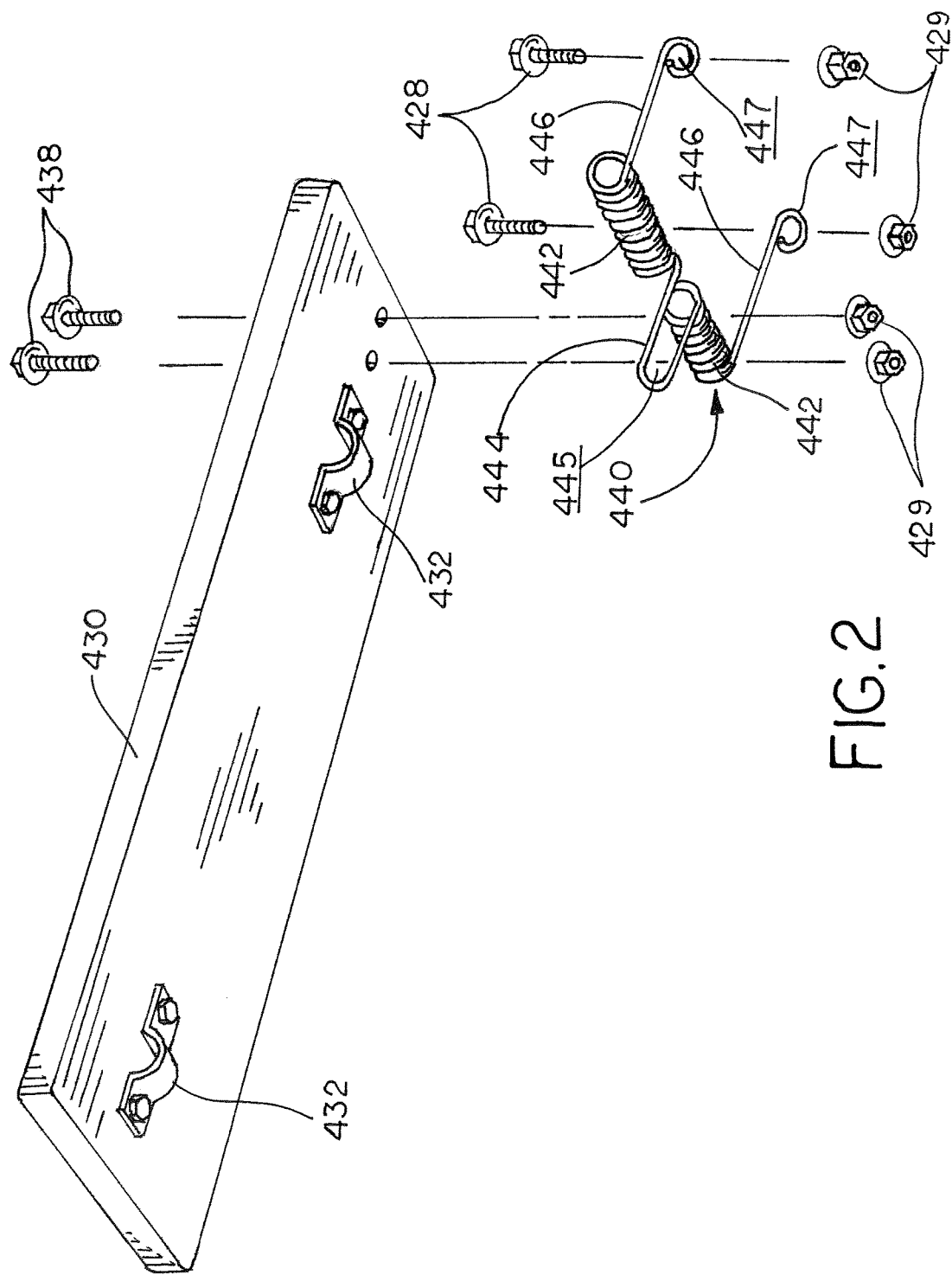
FIG. 2 is an exploded view of the top gate and spring hinge used in the panel housing of FIG. 1 shown from a bottom perspective.
Figure 3:
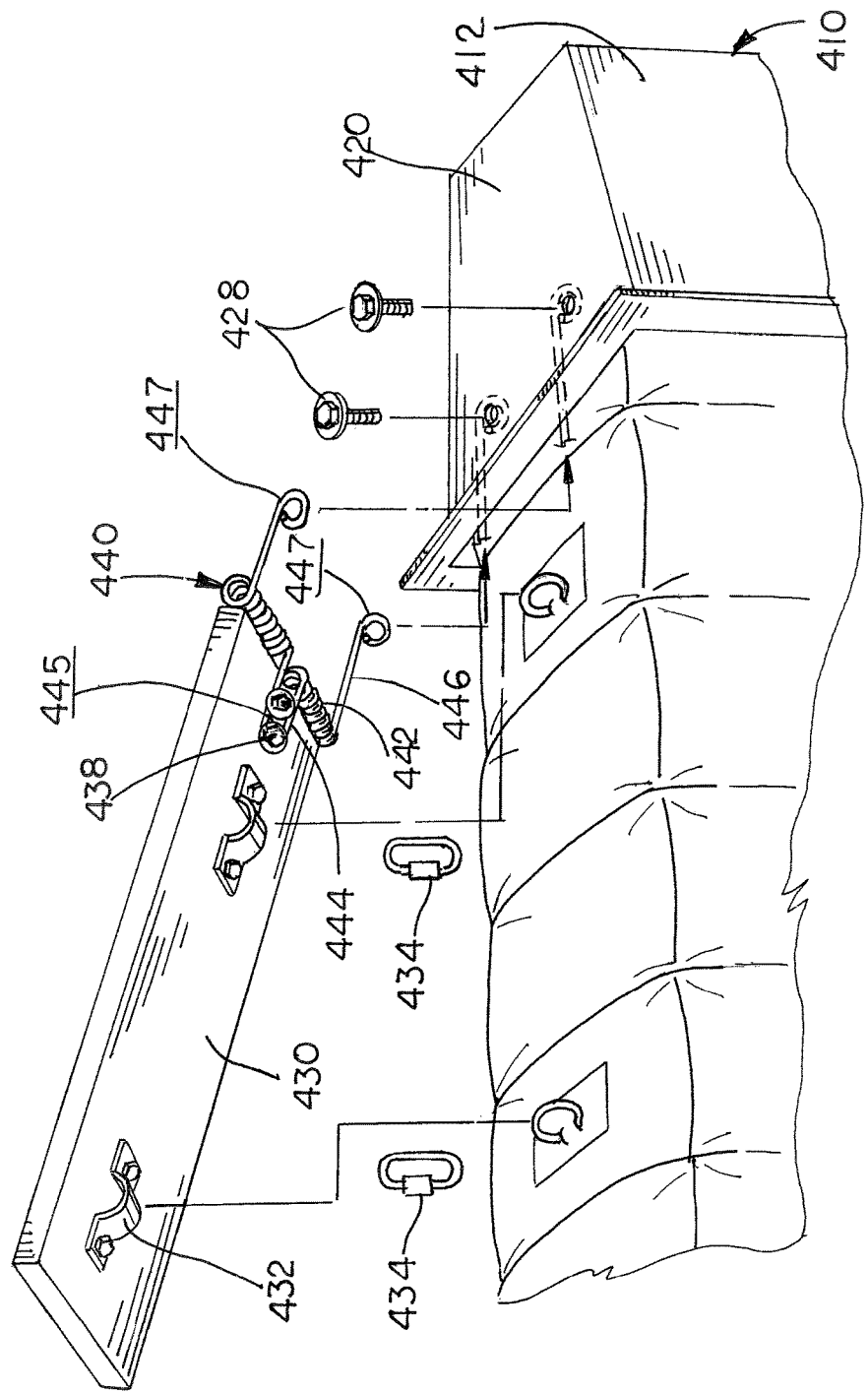
FIG. 3 is another exploded view of the top gate and spring hinge connecting to the panel housing of FIG. 1 shown from a top perspective.
Figure 4:
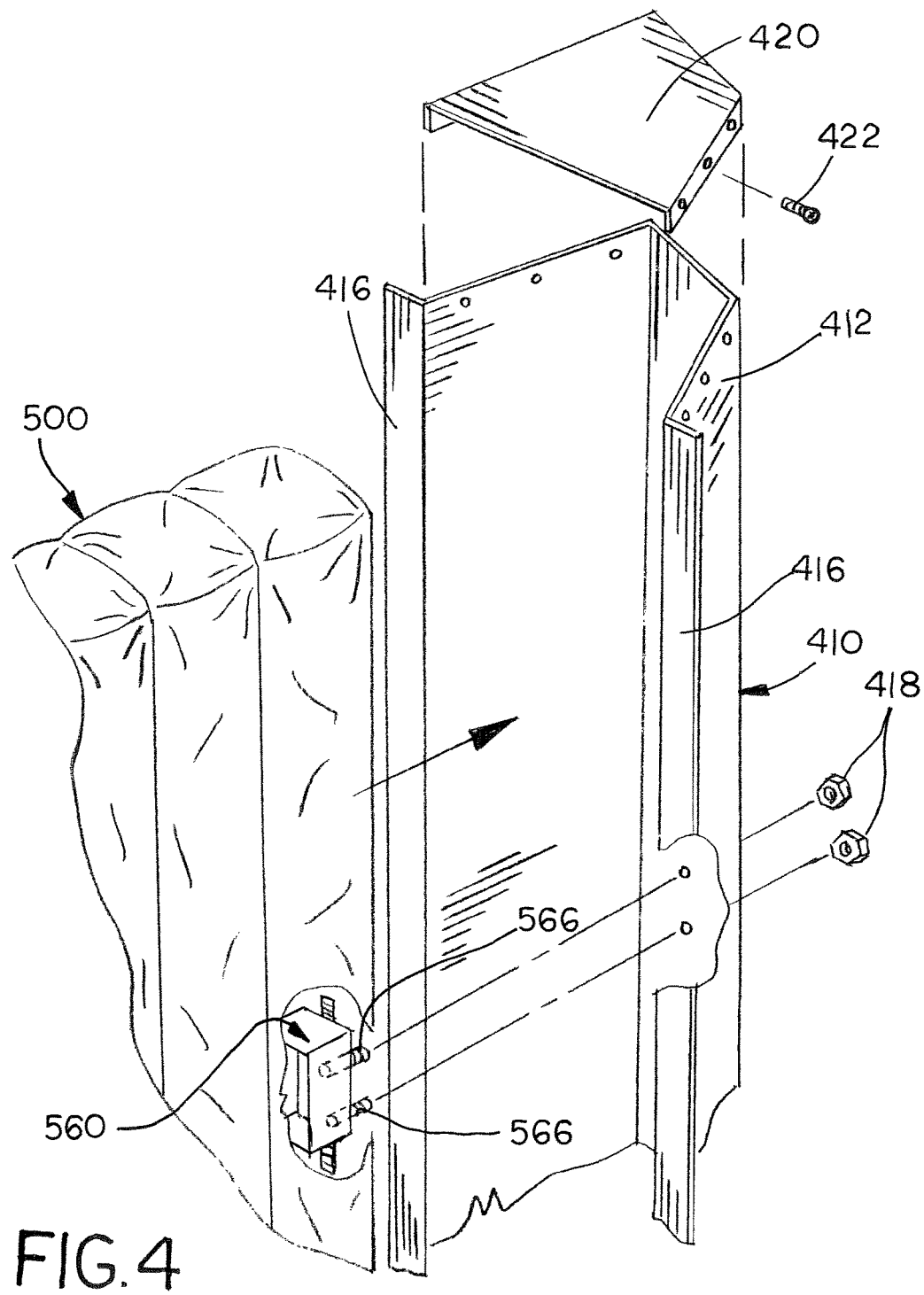
FIG. 4 is a partial exploded view of the inflatable panel and panel housing of FIG. 1.
Figure 5:
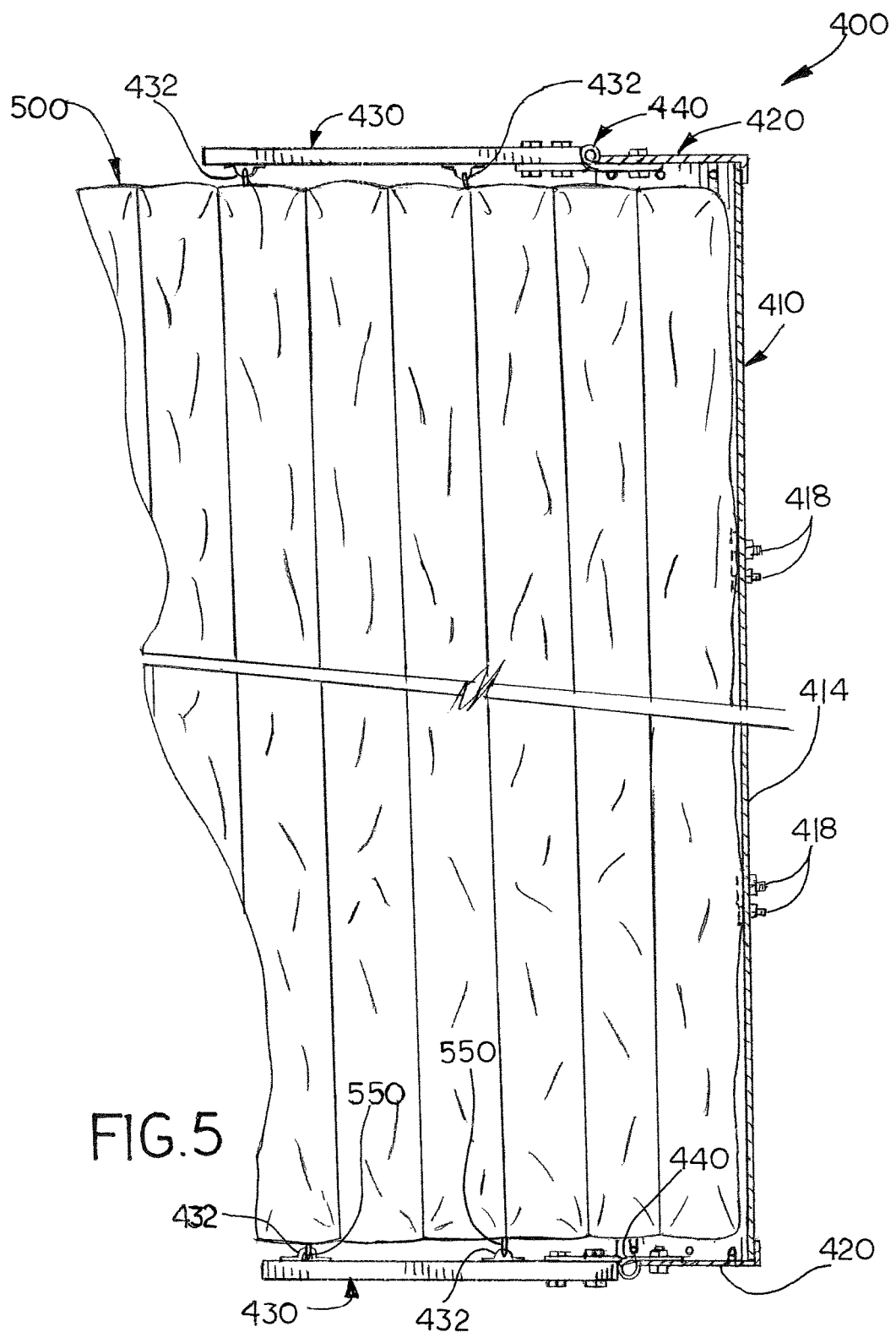
FIG. 5 is a partial side view of the inflated panel deployed from the panel housing of FIG. 1.
Figure 6:
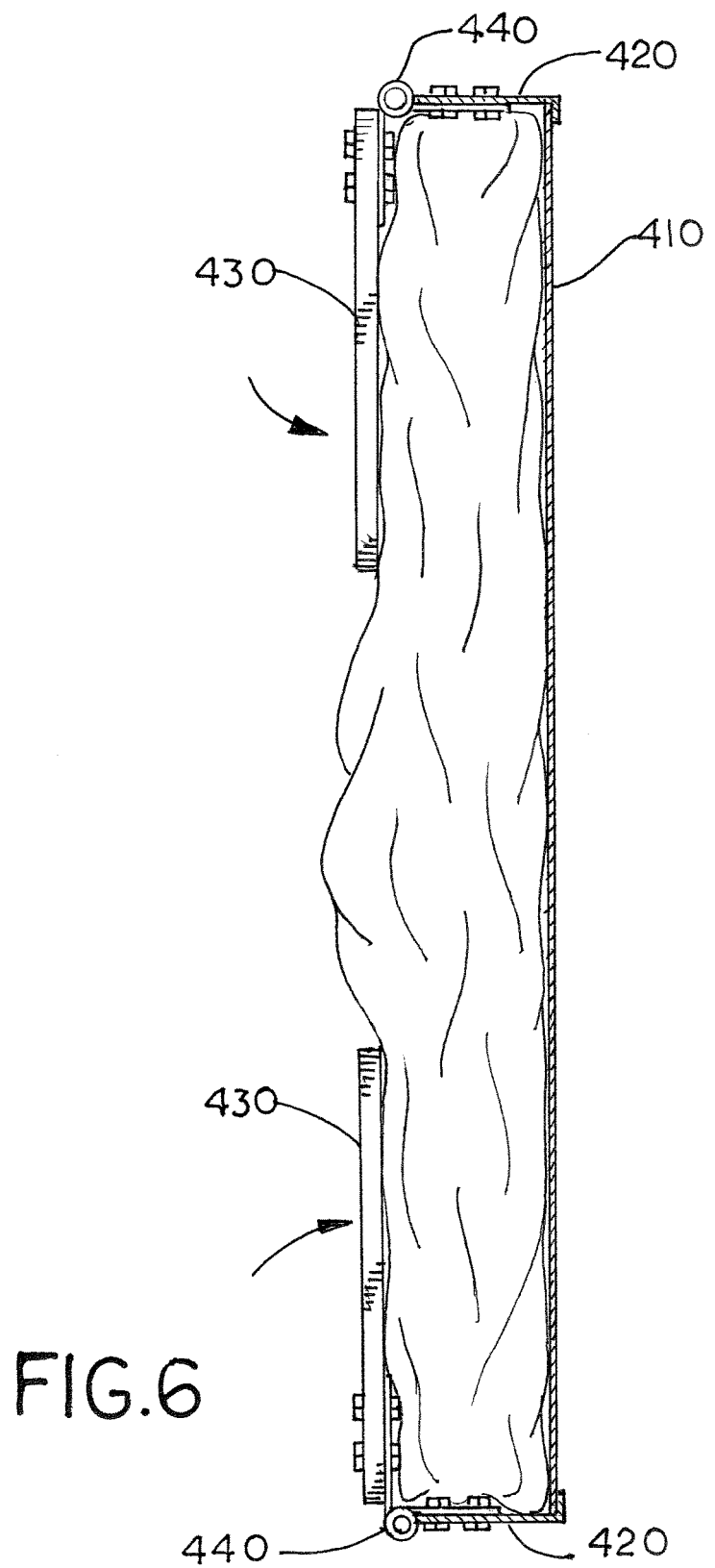
FIG. 6 is a side view of the deflated panel stowed in the panel housing of FIG. 1.

Referring now to the drawings, FIGS. 1-5 illustrate an exemplary embodiment of the panel housing of this invention, which is designated generally as reference numeral 400. Panel housing 400 is part of an aerodynamic fairing assembly mounted behind the cab of a tractor truck (not shown), which deploys inflatable panels covering and enclosing the gap between the tractor truck and the front of the connected semi-trailer. Inflatable panels 500 deploy and retract from panel housing 400 mounted on either side of a tractor cab (not shown). Panel housing 400 uses "shaft-less" spring hinges to pivotally connect a pair of gates that open when the inflated panel deploys (FIG. 5) and close when the deflated panel retracts partially enclosing the deflated panels within panel housing 400 (FIG. 6).

As shown, panel housing 400 is a long upright box structure having an open rear side formed by a U-shaped upright member 410 and a pair of end caps 420 fastened to the upright member. Generally, upright member 410 is an extruded polymer plastic, but may in certain embodiments be constructed from sheet metal, such as steel or aluminum. Similarly, end caps 430 and gate members 430 are formed or molded polymer plastic components, but may be constructed from sheet metals. Upright member 410 has two opposed sidewalls 412 and an integral back wall 414 defining panel housing interior 411, which receives the deflated panel 500. Each sidewall 432 has an edge flange 438 that flairs outward from box interior 431. End caps 420 mount to upright member 410 to enclosed the distal ends of panel housing 400. Panel housing 400 also includes a pair of hinged gates 430 that partially enclose the rear opening of panel housing 400 when inflatable panel 500 is deflated and stowed within panel housing interior 431. Gates 430 are flat rectangular planks of a resilient composite material or polymer plastic, but may also be fashioned of a metal or other suitable material. Gates 430 pivot between an open position extending perpendicularly from the upright member 410 and a closed position extending vertically partially covering the open rear of panel housing 130.

Inflatable panels 500 are detachably mounted to panel housing 400 for convenient repair and replacement of the inflatable panels. As shown, inflatable panels 500 include a plurality of D-rings 550 affixed to their top and bottom and a pair of retraction units, which are used to secure the inflatable panels to the panel housing 400. Each gate member 430 has a pair of eyelet brackets 432. D-rings 550 can be directly connected to eyelet brackets 432 or connected using shackles or chain connectors 434, as desired. D-rings 550 and eyelet brackets 432 provide a convenient connection interface between inflatable panel 500 and gate members 430.

Inflatable panel 500 includes internal retraction units 560, which are secured to back wall 414. Retraction units 560 use a retractable cable wound around a spring tensioned spool to pull the deflated panel 500 back into the panel housing. Each retraction unit 560 has a pair of threaded studs 566 that extend through bores 415 in back wall 414 and are secured by nuts 418. Connecting retraction units 560 to upright 410 ensures that inflatable panel 500 is seated securely within housing interior 411.

Gates 430 are pivotally connected to end caps 420 by a "shaft-less" spring hinge 440. Spring hinge 440 is constructed from a wire rod of spring steel that is bent to form a pair of axially aligned spring coils 442, a central U-shaped neck 444 and a pair of parallel end arms 446. The U-shaped bend of neck 444 forms an elongated slot 445 and the distal ends of end arms 446 are bent to form eyelets 447. Spring hinge 440 is bolted to gate 430 by a pair of bolts 438 and hex nuts 439. Bolts 438 extend through bores 431 in gate member 430 and through the elongated slot 445 formed by the U-shaped bend of neck 444. Spring hinge 440 is bolted to end caps 420 by a pair of bolts 428 and hex nuts 429. Bolts 428 extend through bores 421 in end caps 420 and through eyelets 447 of spring hinge 440.

Spring hinge 440 functions as both a mechanical hinge and a simple torsion spring, which biases gates 430 toward their closed (vertical) orientation. Spring hinge 440 allows gate member 430 to pivot generally about the center axis of coils 442 between the gates open and closed orientation. Because spring hinge 440 employs no physical shaft or pin as an axis of rotation, the bent wire rod construction of hinge 440 allows a degree of lateral play and deviation in the pivotal movement as gate 430 moves between its open and closed orientations. The bent wire rod construction of spring hinge 440 allows it to bend and deflect slightly as the gate opens and closes, which helps breaks up any ice that may collect around the hinge. Consequently, spring hinge 440 eliminates any mechanical binding that can occur with conventional hinges under external forces, particularly lateral loads caused by cross winds and physical obstructions.

Spring hinge 440 also eliminates the need for a separate coil or torsion spring to urge gates 430 toward their normally closed position. Spring hinge 440 is sprung or wound to exert a spring force on gate 430 to urge it towards its closed position, which helps hold the deflated panel 500 within housing interior 411. The inflated panel 500 deploys from the panel housing 400 pivoting gates 430 open against the spring force of spring hinges 440.

Spring hinge 440 is engineered to operate in concert with retraction unit 560 of inflatable panel 500, so that the center of panel 500 retracts back into panel housing 400 before gates 530 close over the panel corner ends. Consequently, spring hinge 440 is engineered to generate a spring force on gate 430 that is apply in unison to the cable tension applied from the sprung spool of the retraction unit 560 to not only fully retract panel 500 into panel housing 400, but with properly timing.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. An improvement in an aerodynamic fairing assembly for a tractor-trailer having a panel housing and an inflatable panel mounted to the panel housing where the inflatable panel inflates to extend from the panel housing to a deployed position and deflates to retract into the panel housing in a stowed position, the improvement comprises the panel housing including a gate and a spring hinge pivotally connecting the gate to the panel housing for movement between an open orientation when the inflatable panel extends from the panel housing and a closed position when the inflatable panel is retracted into the panel housing, the spring hinge having a pair of axially aligned coils, an integral neck part connected between the pair of coils and affixed to the gate, and a pair of integral end arms each extending from the one of the pair of coils and affixed to the panel housing.

2. The improvement of claim 1 wherein the spring hinge is tensioned to exert a force on the gate to urge the gate towards the closed orientation.

* * * * *